Patented Apr. 22, 1947

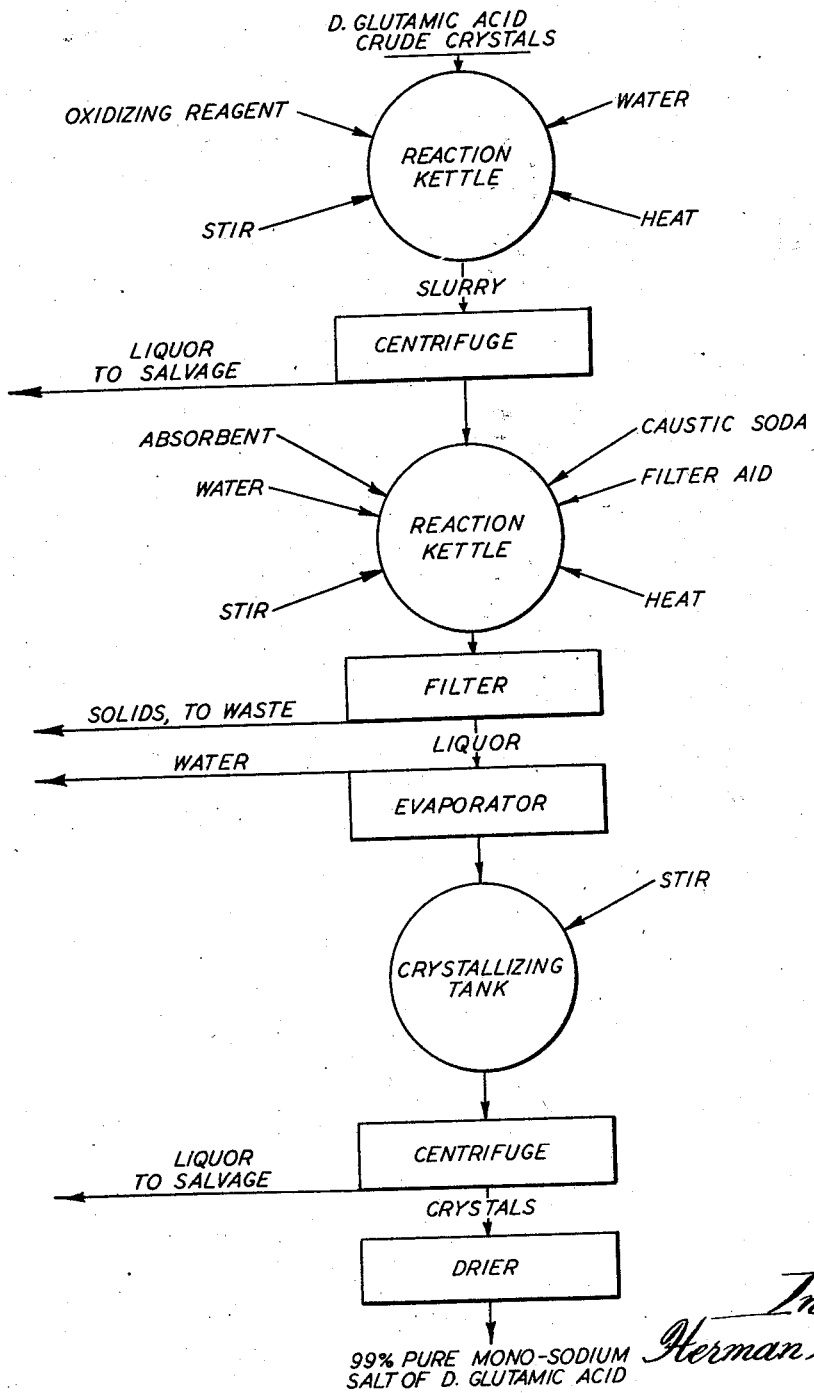

2,419,256

UNITED STATES PATENT OFFICE 2,419,256

MANUFACTURE OF SALTS OF GLUTAMIC ACID

Herman W. Dorn, Toledo, Ohio, assignor to International Minerals & Chemical Corporation, a corporation of New York Application November 25, 1943, Serial No. 511,647

8 Claims. (Cl. 260—529)

The invention relates to improvements in the manufacture of salts of glutamic acid and has particular reference to the manufacture of an alkali metal salt of d-glutamic acid (the dextro rotatory species sometimes designated 1 (+) glutamic acid). The principal objects of the invention are to provide an improved process for converting crude d-glutamic acid crystals into a salt of high purity with a high yield and a minimum of wastage, in an economical and efficient manner.

The invention will be described as applied to the manufacture of the material known as monosodium glutamate from d-glutamic acid in crystal form containing about 70% of pure d-glutamic acid. Such a material may be produced by the process set forth in the Masuda-Royal-Marshall Patent No. 1,947,563.

The process steps involved in this specific embodiment of the invention are graphically illustrated in the drawing accompanying this application, said drawing being a simplified diagram or flow sheet of the new process.

At the outset it may be well to state that crude glutamic acid such as is produced in the initial stages of the process set forth in the patent referred to not only contains only about 60% to 85% of the pure acid, but it also contains or carries with it a sufficient amount of dark colored material to give a brown or reddish-brown appearance to the material. Since one of the principal uses of the mono-sodium salt of d-glutamic acid is to impart a proper taste and meat flavor to such foods as soups, it is obvious that the material should be of an extremely high degree of purity and should not contain any deleterious materials which would affect either the color or appearance of the material or which would cause the development of bad flavors.

Repulping and re-crystallization of the crude crystals have been attempted, and other methods designed to overcome the purification problems have been proposed. However, such methods have usually resulted in two disadvantages. In the first place, although pure d-glutamic acid is soluble in water to the extent of only about 1% at normal temperatures, the crude material is soluble to a much greater extent. Therefore, losses of valuable material have been higher than desired and yields have been correspondingly lower. Furthermore, so far as I am aware, although some methods of purification hitherto practiced have been fairly successful in obtaining a fairly high yield, the end product has sometimes been so contaminated with foreign dark colored material that the appearance of the product has been unsatisfactory from a sales standpoint, and furthermore some of the material has had a tendency to develop unwanted odors when stored for any length of time.

It has been found that, although the trade will accept a perfectly white and clean looking salt the analysis of which discloses a relatively low percentage of pure material, it is difficult to dispose of a product which is off-color, even though its percentage of pure salt may be as high as 99% or more. In other words, an exceedingly minute percentage of the undesirable impurity is not only sufficient to impart a dark color to the material, but it also makes it otherwise unsatisfactory, whereas, if the material is white in color, a much larger percentage of foreign salt is comparatively innocuous so far as the utility or salability of the product is concerned. Of course, it will be understood that the price of the material in any case will be based upon the pure chemical content expressed in terms of pure mono-sodium glutamate.

Hence, it will be seen that the major problem in obtaining a salable glutamate is in the elimination of the impurities which impart an off color to the end product. The exact chemical composition of these impurities is a matter of some dispute. It is sufficient to say that I have discovered a process for efficiently and economically removing these malevolent impurities while at the same time obtaining an extremely high yield with relatively small losses in the various process steps.

In general, it may be said that an important part of my process consists in the initial treatment of the crude d-glutamic acid crystals with a reagent having a strong oxidizing effect, preferably a material which will part with its combined oxygen quite freely, for example, sodium or potassium chlorite, sodium or potassium peroxide, benzoyl peroxide, sodium or potassium hypochlorite, hypochlorous acid or hydrogen peroxide.

In the case of hydrogen peroxide, the reagent reacts with the inorganic impurities present (mainly sodium and potassium chlorides), to form addition products which are extremely soluble and readily removed in the washing process. The elimination of the inorganic salts also has a favorable influence in reducing losses of glutamic acid, inasmuch as the latter is much less soluble in water than in salt solutions. The removal of color is based upon the bleaching action of the hydrogen peroxide, combined with that of hypochlorous acid, some of which is produced by the interaction of the hydrogen peroxide with hydrochloric acid present in the mixture.

As used in the specification and claims, the terms "peroxides" and "chlorites" are intended to include not only the above stated respective salts with metals but also those compounds in which the metal ions are replaced by hydrogen ions. In addition, the term "chlorites" is intended to include the hypochlorite metal salts and hypochlorous acid.

After treating an aqueous slurry of the crude crystals with one of these oxidizing reagents, the mixture is centrifuged, and the valuable material in the form of the solid crystals is introduced into a reaction tank and stirred up with additional water and an alkaline material which combines with the glutamic acid to form a monobasic salt.

Into this tank or kettle there is also introduced a supply of activated adsorbent such as carbon together with a filter-aid, and after the reaction is complete and the materials have been thoroughly mixed together, the batch is run through a filter, and the solids may be discarded. The filtrate is then evaporated, preferably in vacuo, and crystallized. The crystals of the mono-basic salt are then centrifuged to remove as much liquor as possible mechanically, after which the solid crystals are subjected to a short drying operation and are then screened, graded and packaged for sale.

Specific Example 1

Hydrogen peroxide 1,000 lbs. of crude crystals of d-glutamic acid produced from Steffen's waste by an alkaline hydrolysis method such as is disclosed in the Masuda et al. Patent No. 1,947,563 heretofore referred to, are introduced into a reaction kettle. This kettle is provided with stirring means and a jacket so that steam for heating purposes may be admitted thereto. At the same time, there are introduced into the kettle 200 lbs. of hydrogen peroxide having a strength of 30% by volume or 27.6% by weight together with about 850 lbs. of water so as to produce a liquid slurry.

The batch is stirred for a period of 45 minutes, the heat first having been raised to about 85° C. The batch is then cooled to 25° C. and held for about 2 hours. It is then discharged from the reaction kettle and into a continuous or batch centrifuge, and the liquor is thereby separated from the crystals and may be discarded, or if desired, returned to a prior step of the glutamic acid process for salvage.

The crystals from the centrifuge are then introduced into a second reaction kettle along with 200 lbs. of 50% caustic soda solution together with an additional 830 lbs. of pure water and preferably 300 gallons of mono-sodium glutamate solution of 1.250 specific gravity. There is also introduced into this reaction kettle a supply of adsorbent, for example 40 lbs. of activated carbon, and it is advisable also to add about 12 lbs. of filter aid. This reaction kettle is provided with stirring arrangements and a jacket so that steam can be supplied thereto for heating purposes. The batch is heated to about 55° C., and this temperature is maintained for about 20 minutes, meanwhile stirring the batch vigorously.

After the glutamic acid crystals have been reacted by the caustic soda and the chemical has gone into solution, the batch is discharged from the kettle and passed through a filter, preferably of the filter-press type, and the solids, consisting principally of carbon and filter-aid, may be discarded. The filtrate is then concentrated by evaporating in a single effect evaporator at a temperature of about 58° C. until the concentration of mono-sodium glutamate reaches about 75 per cent.

The solution is then introduced into a crystallizing tank equipped with stirring arrangements, and, as the batch cools, the crystals begin to form. The purpose of stirring the material is to keep the batch thoroughly mixed and at the same time prevent the formation of crystals of excessive size while maintaining homogeneity of the product.

After the liquor has been stirred in the crystallizing tank for about 16 hours, the temperature having dropped meanwhile to about 25° C., the crystallization is found to be practically complete. The mother liquor is then separated from the crystals of mono-sodium glutamate by centrifuging, preferably in a basket or batch type machine. The liquor is returned to a previous stage of the process for salvage purposes, and the crystals removed from the centrifuge are subjected to a short drying operation such as tunnel drying, at a temperature of about 90° F. for a period of 4 hours, after which the dried material may be crushed, screened, and packaged for sale.

The mono-sodium glutamate prepared in accordance with the above described process is as white as ordinary table salt. It is free from deleterious impurities which might have an effect upon its flavor or keeping properties, and furthermore it contains as high as 99% of the pure salt by chemical analysis.

The yield is high and losses correspondingly low. In fact, when the process is performed with ordinary care, there is a loss of only 9 per cent in the process as I have described it, and a large part of that loss may be eliminated by the use of appropriate salvage procedures.

Example 2

Sodium hypochlorite

Since lime salts are undesirable and extremely difficult to remove in the production of high grade mono-sodium glutamate, bleaching powder (or any convenient source material) is converted into a 7% solution of sodium hypochlorite in any one of several ways well known to the industry. This 7% solution of sodium hypochlorite is then used as follows:

To 100 grams of crude glutamic acid (approximately 70–80% pure and 10–20% moisture content) are added, with constant agitation, 176 grams of 7% NaOCl solution and 18 grams of concentrated (37%) HCl. This mixture is then slowly heated to 85° C. over a period of at least 30 minutes and held at this temperature for 45 minutes. This mixture is then cooled to 25° C. and filtered. The glutamic acid so obtained is approximately 96% pure and possesses a light tan color. It will be noted that this procedure causes the release of HOCl within the mix. It will also be noted that the purified glutamic acid obtained by this method is not quite of such high grade as by hydrogen peroxide procedure.

Example 3

Sodium peroxide

To 100 grams of crude glutamic acid (approximately 70–80% pure and 10–20% moisture content) are added, with constant agitation, 129 grams of 10% $Na_2O_2$ and 32.4 grams of concentrated (37%) HCl. These constituents are brought together with caution to prevent too violent a reaction. The temperature of the mix is then raised slowly to 85° C. (over a 30 minute period) and held at this temperature for 45 minutes, cooled to 25° C. and then filtered.

The glutamic acid so obtained is approximately 97% pure and also possesses a very light tan color. Here both the peroxide and the oxygen from that peroxide are released within the mixture. This end product is very nearly identical with that obtained from the hydrogen peroxide procedure itself.

I claim:

1. A process of purifying crude glutamic acid obtained from the hydrolysis of proteinaceous materials which comprises contacting the crude glutamic acid with a small amount of an oxidizing agent selected from the group consisting of peroxides and chlorites at a temperature not in excess of about 85° C. and separating the impurities from the glutamic acid.

2. A process of purifying crude glutamic acid obtained from the hydrolysis of proteinaceous materials which comprises contacting the crude glutamic acid with a small amount of hydrogen peroxide at a temperature not in excess of about 85° C. and separating the impurities from the glutamic acid.

3. A process of purifying crude glutamic acid obtained from the hydrolysis of proteinaceous materials which comprises contacting the crude glutamic acid with a small amount of sodium peroxide at a temperature not in excess of about 85° C. and separating the impurities from the glutamic acid.

4. A process of purifying crude glutamic acid obtained from the hydrolysis of proteinaceous materials which comprises contacting the crude glutamic acid with a small amount of sodium hypo-chlorite at a temperature not in excess of about 85° C. and separating the impurities from the glutamic acid.

5. A process of purifying crude glutamic acid obtained from the hydrolysis of proteinaceous materials which comprises contacting the crude glutamic acid with a small amount of an oxidizing agent selected from the group consisting of peroxides and chlorites at a temperature of about 85° C. for about 45 minutes followed by cooling the resultant mixture to a temperature of about 25° C. and separating the impurities from the glutamic acid.

6. A process as in claim 5 wherein the oxidizing agent is hydrogen peroxide.

7. A process of purifying crude glutamic acid obtained from the hydrolysis of proteinaceous materials and producing salts thereof which comprises contacting the crude glutamic acid with a small amount of an oxidizing agent selected from the group consisting of peroxides and chlorites at a temperature not in excess of about 85° C. and separating the impurities from the glutamic acid, followed by treating the purified glutamic acid compound with an alkali metal hydroxide and adsorbent carbon.

8. A process as in claim 7 wherein the oxidizing agent is hydrogen peroxide and the alkali metal hydroxide is sodium hydroxide.

HERMAN W. DORN.

REFERENCES CITED

The following references are of record in the file of this patent:

UNITED STATES PATENTS

| Number | Name | Date |
|---|---|---|
| 2,013,082 | Vana | Sept. 3, 1935 |
| 2,013,096 | Haag | Sept. 3, 1935 |
| 2,101,998 | Haag | Dec. 14, 1937 |
| 2,125,383 | Macallum | Aug. 2, 1938 |
| 2,305,103 | Osgood | Dec. 15, 1943 |
| 2,306,646 | Shildneck | Dec. 29, 1942 |
| 2,214,115 | Bishop et al. | Sept. 10, 1940 |
| 2,108,448 | Rutherford | Feb. 15, 1938 |

OTHER REFERENCES

Herter, J. Biol. Chem., vol. 5, pp. 409–11.

Effront, Compt. rend. (French Acad. Sciences), vol. 154, pp. 1296–8.

Negelen, Chem. Abst., vol. 18, p. 3198. (Copies of periodicals in Scientific Lib.)